United States Patent
Belling

(10) Patent No.: US 11,510,105 B2
(45) Date of Patent: Nov. 22, 2022

(54) USER PLANE FUNCTION (UPF) CONTROL WITH COEXISTENCE OF POLICY CONTROL AND PACKET FILTERS DYNAMICALLY GENERATED AT THE SESSION MANAGEMENT FUNCTION (SMF)

(71) Applicant: NOKIA TECHNOLOGIES OY, Espoo (FI)

(72) Inventor: Thomas Belling, Erding (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 95 days.

(21) Appl. No.: 17/176,603

(22) Filed: Feb. 16, 2021

(65) Prior Publication Data

US 2021/0258831 A1    Aug. 19, 2021

Related U.S. Application Data

(60) Provisional application No. 62/977,992, filed on Feb. 18, 2020.

(51) Int. Cl.
*H04W 28/08* (2009.01)
*H04L 47/20* (2022.01)
(Continued)

(52) U.S. Cl.
CPC ......... *H04W 28/0967* (2020.05); *H04L 47/20* (2013.01); *H04L 47/2441* (2013.01);
(Continued)

(58) Field of Classification Search
None
See application file for complete search history.

(56) References Cited

U.S. PATENT DOCUMENTS

| 8,478,707 B1 * | 7/2013 | Ong | H04L 45/54 |
|---|---|---|---|
| | | | 709/215 |
| 2015/0134923 A1 * | 5/2015 | Kulkarni | G06F 3/067 |
| | | | 711/162 |
| 2022/0060416 A1 * | 2/2022 | Zhu | H04L 45/74 |

OTHER PUBLICATIONS

Extended European Search Report dated Jun. 16, 2021 corresponding to European Patent Application No. 21155366.4.

(Continued)

*Primary Examiner* — Anh Ngoc M Nguyen
(74) *Attorney, Agent, or Firm* — Squire Patton Boggs (US) LLP

(57) ABSTRACT

Systems, methods, apparatuses, and computer program products for UPF control with coexistence of policy control and packet filters dynamically generated at the SMF. For example, if the SMF obtains an event subscription with traffic descriptors from another entity, and if there is no installed PDR with the same traffic descriptor, the SMF may construct a PDR with an action according to the subscribed event. The SMF may configure the UPF with the constructed PDR. In certain embodiments, to construct the PDR, the SMF may copy the PDR that would have previously matched the incoming traffic described by the traffic descriptor in the notification subscription, and associates the PDR with a higher priority, the traffic descriptor and a notification action according to the subscribed event. To configure the UPF, the SMF may provide the PDR with the higher priority, the received traffic descriptor, and the notification action, according to some embodiments.

12 Claims, 6 Drawing Sheets

(51) Int. Cl.
*H04L 47/2441* (2022.01)
*H04L 47/32* (2022.01)
*H04W 28/04* (2009.01)
*H04W 28/24* (2009.01)

(52) U.S. Cl.
CPC .............. *H04L 47/32* (2013.01); *H04W 28/04* (2013.01); *H04W 28/24* (2013.01)

(56) References Cited

OTHER PUBLICATIONS

Nokia et al., "Update to Availability after DDN Failure event to support PCC," 3GPP Draft; S2-1907003, 3GPP TSG-SA2 Meeting #134, Sapporo, Japan, Jun. 18, 2019, XP051751981.
3GPP TS 23.502 V16.3.0 (Dec. 2019), Technical Specification, 3rd Generation Partnership Project; Technical Specification Group Services and System Aspects; Procedures for the 5G System (5GS); Stage 2 (Release 16), Dec. 22, 2019, pp. 1-558, XP051840932.
Nokia et al., "Coexistence of PCC control and detection of "DDD status" event and the "Availability after DDN Failure" events with buffering at the UPF," 3GPP Draft, S2-2001809, SA WG2 Meeting #137-E, Online, Feb. 18, 2020, XP051855221.
Nokia et al., "Detection of 'Downlink data delivery status' and 'Availability after DDN Failure' events," 3GPP Draft; S2-1906945, 3GPP TSG-SA WG2 Meeting #134, Sapporo, Japan, Jun. 24-28, 2019.
Nokia et al., "Subscription to downlink data delivery status event via PCC," 3GPP, S2-1907004, 3GPP TSG-SA2 Meeting #1334, Reno, Nevada, USA, May 13-17, 2019.
3GPP TS 23.501 V16.3.0 (Dec. 2019), Technical Specification, 3rd Generation Partnership Project; Technical Specification Group Services and System Aspects; System architecture for the 5G System (5GS); Stage 2 (Release 16), Dec. 2019.
CT3, "LS on Nsmf_EventExposure and Nnef_EventExposure service handling of the "Downlink data delivery status" and "Availability after DDN Failure" events," 3GPP, 03-191407, 3GPP TSG-CT WG3 Meeting #102, Xi An, China, Apr. 8-12, 2019.
CT3, "LS on Nsmf_EventExposure and Nnef_EventExposure service handling of the "Downlink data delivery status" and "Availability after DDN Failure" events," 3GPP, S2-1904878, SA WG2 Meeting #S2-133, Reno, Nevada, USA, May 13-17, 2019.
Ericsson, "Availability after DDN Failure in 5GC," 3GPP, S2-2001256, 3GPP TSG-SA2 Meeting #136AH, Incheon, KR, Jan. 13-17, 2020.
Ericsson, "Availability after DDN Failure event with UPF buffering," 3GPP S2-2001678, 3GPP TSG-SA2 Meeting #136AH, Incheon, Korea, Jan. 13-17, 2020.
Huawei et al., "DDD status event with UPF buffering procedure," 3GPP S2-2001687, 3GPP TSG-WG SA2 Meeting #136AH, Incheon, South Korea, Jan. 13-17, 2020.
Notice of Reasons for Rejection dated Feb. 1, 2022 corresponding to Japanese Patent Application No. 2021-017993, with English summary thereof.

* cited by examiner

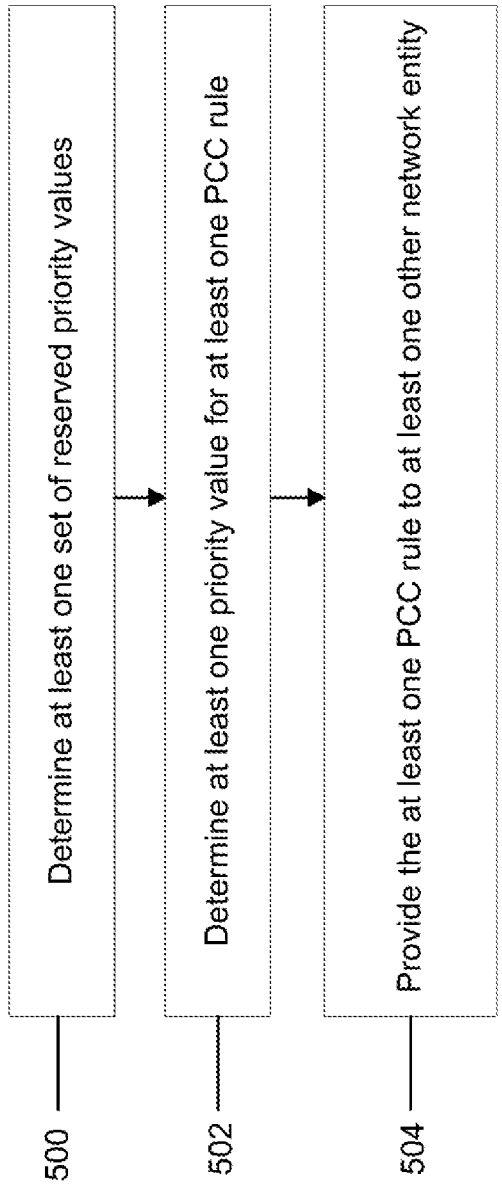

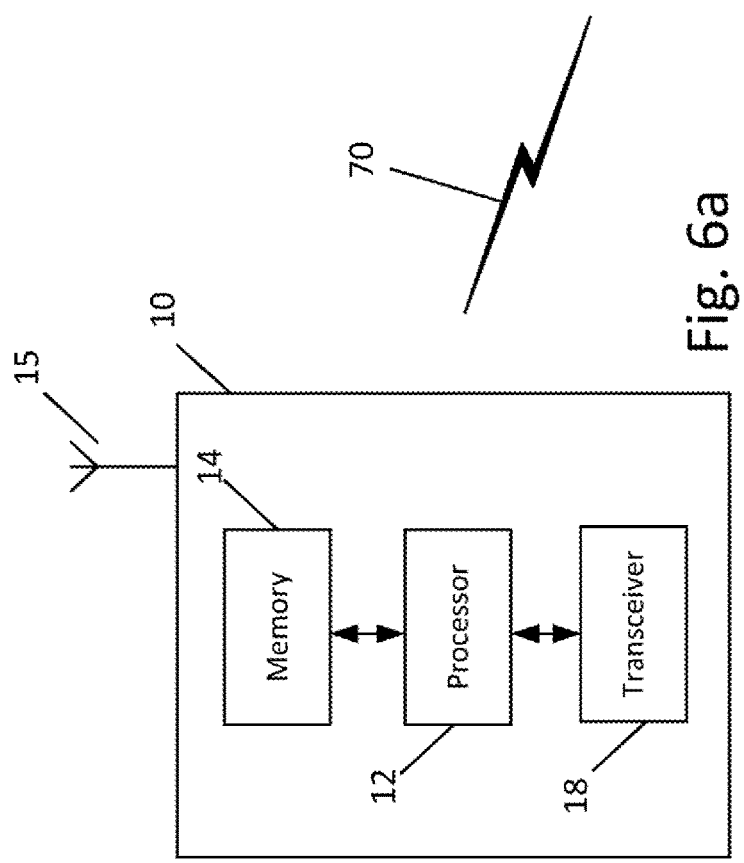
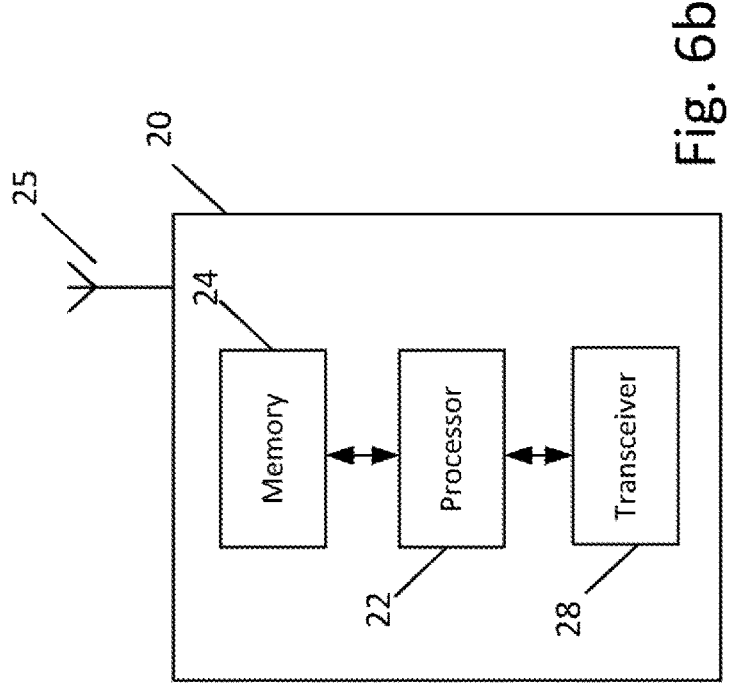
Fig. 6a
Fig. 6b

USER PLANE FUNCTION (UPF) CONTROL WITH COEXISTENCE OF POLICY CONTROL AND PACKET FILTERS DYNAMICALLY GENERATED AT THE SESSION MANAGEMENT FUNCTION (SMF)

CROSS REFERENCE TO RELATED APPLICATION

This application claims priority from U.S. Provisional Patent Application No. 62/977,992, filed on Feb. 18, 2020. The contents of this application is hereby incorporated by reference.

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for user plane function (UPF) control with coexistence of policy control and packet filters dynamically generated at the session management function (SMF).

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. 5G is mostly built on a new radio (NR), but a 5G (or NG) network can also build on E-UTRA radio. It is estimated that NR may provide bitrates on the order of 10-20 Gbit/s or higher, and may support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) may be named gNB when built on NR radio and may be named NG-eNB when built on E-UTRA radio.

BRIEF DESCRIPTION OF THE DRAWINGS

For proper understanding of example embodiments, reference should be made to the accompanying drawings, wherein:

FIG. 5 illustrates an example flow diagram of a method, according to some embodiments;

FIG. 6a illustrates an example block diagram of an apparatus, according to an embodiment; and FIG. 6b illustrates an example block diagram of an apparatus, according to another embodiment.

DETAILED DESCRIPTION

Figure 1:
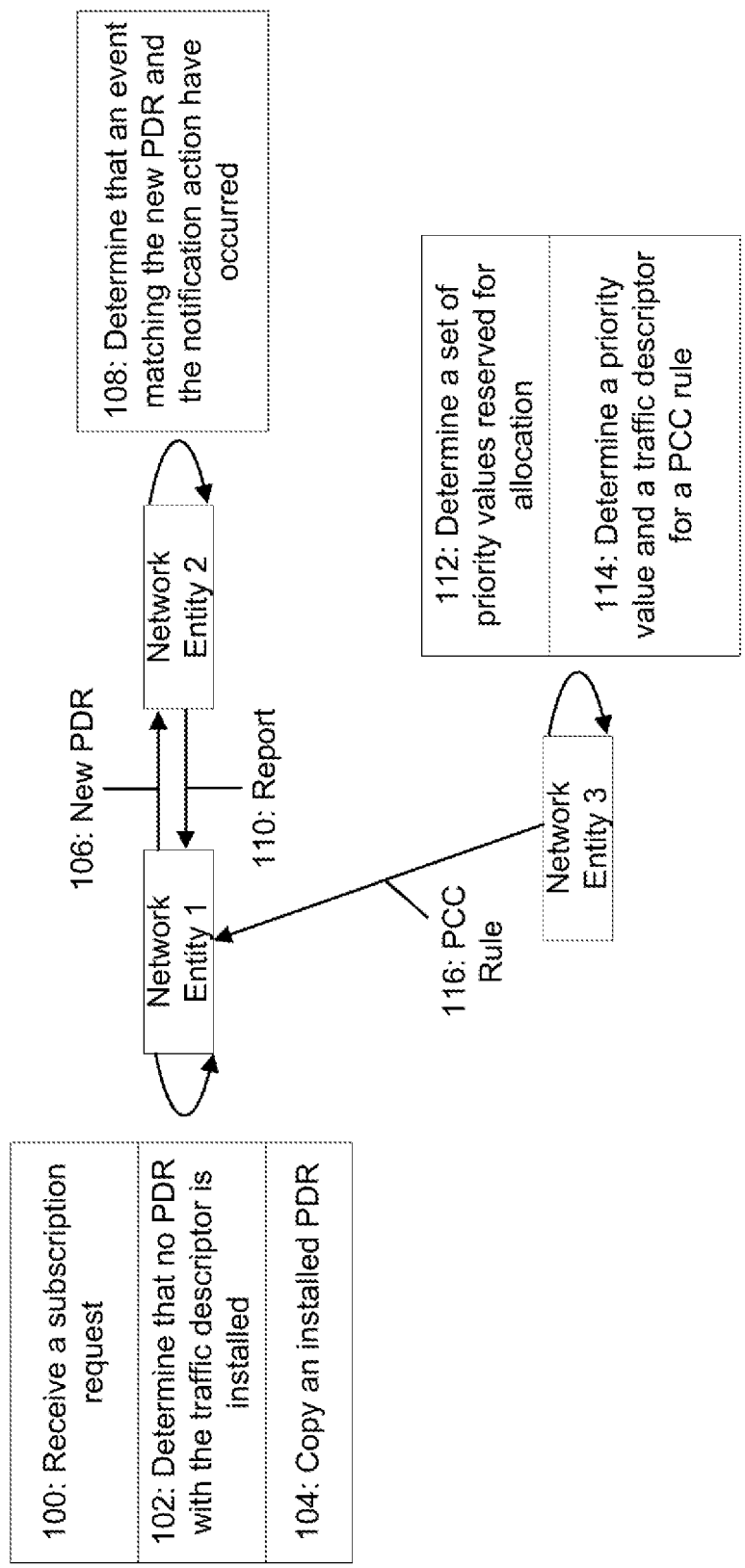
FIG. 1 illustrates an example of UPF control with coexistence of policy control and packet filters dynamically generated at the session management function (SMF), according to some embodiments.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for UPF control with coexistence of policy control and packet filters dynamically generated at the SMF is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments. In addition, the phrase "set of" refers to a set that includes one or more of the referenced set members. As such, the phrases "set of," "one or more of," and "at least one of," or equivalent phrases, may be used interchangeably.

Additionally, if desired, the different functions or operations discussed below may be performed in a different order and/or concurrently with each other. Furthermore, if desired, one or more of the described functions or operations may be optional or may be combined. As such, the following description should be considered as merely illustrative of the principles and teachings of certain example embodiments, and not in limitation thereof.

3GPP is standardizing procedures to support the internet of things (IoT) over a cellular 5G system. Some procedures have related to detection of the IoT related DDD status event and the availability after DDN failure event when UPF buffering is applied. For the DDD status notifications, the unified data management (UDM) may subscribe at the SMF and may provide a traffic descriptor describing the source of those packets so that notifications for packets from that source are provided. For the availability after DDN failure event, the access management function (AMF) may subscribe to DDN failure notifications at the SMF and may also provide a traffic descriptor describing the source of those packets so that notifications for packets from that source are provided. According to some procedures, the SMF may then configure the UPF with a packet detection rule (PDR)

including a traffic descriptor and an action to report when corresponding packets are buffered and/or discarded.

Currently, proposed procedures have not addressed how those procedures can coexist with policy and charging control (PCC). PDRs may contain traffic descriptors and priority values. The UPF may try to match each incoming packet against the traffic descriptors of configured PDRs in the order of their priorities and may apply the actions of the first matching PDR on the packet. If PCC is used, the policy and charging function (PCF) may supply PCC rules, which may also contain traffic descriptors and priority values, to the SMF, and the SMF may determine corresponding PDRs to be supplied to the UPF. The PCF may, at any time, add new PCC rules. The PCF may have to have knowledge and possible control over all applied traffic filters and their priorities for a protocol data unit (PDU) session to select PCC rules with appropriate priorities and achieve the desired packet handling. (e.g., the PCC may know the concept of predefined PCC rules in the SMF activated at the PDU session establishment, but it is assumed that the PCF has configured knowledge of such preconfigured PCC rules). However, the PCF may not have any knowledge of the traffic filters for DDN failure notifications and/or DDD status notifications configured and the related priorities selected by the SMF.

Some embodiments described herein may provide for UPF control with coexistence of policy control and packet filters dynamically generated at the SMF. For example, if the SMF obtains an event subscription (e.g., for the DDD status and/or DDN failure notifications) with traffic descriptors from another entity, and if there is no installed PDR with the same traffic descriptor, the SMF may construct a PDR with an action according to the subscribed event. The SMF may configure the UPF with the constructed PDR. In certain embodiments, to construct the PDR, the SMF may copy the PDR that would have previously matched the incoming traffic described by the traffic descriptor in the notification subscription, and associates the PDR with a higher priority, the traffic descriptor and a notification action according to the subscribed event. To configure the UPF, the SMF may provide the PDR with the higher priority, the received traffic descriptor, and the notification action, according to some embodiments. If PCC is used, the SMF may assign a priority value from a reserved range not used by the PCF with higher priorities than other priorities supplied by the PCF.

FIG. 1 illustrates an example of UPF control with coexistence of policy control and packet filters dynamically generated at the SMF, according to some embodiments. As illustrated, a network entity 1 (e.g., an SMF), a network entity 2 (e.g., a UPF), and a network entity 3 (e.g., a PCF) may be in communication.

In certain embodiments, the network entity 1 may use certain procedures and PDRs to configure the network entity 2. For example, the network entity 1 may configure the network entity 2 to buffer packets. As illustrated at 100, the network entity 1 may receive a subscription request for a notification. The subscription request may comprise a traffic descriptor (e.g., information that identifies a source, a destination, and/or the like of the traffic). The notification may comprise a DDD status notification and/or a DDN failure notification.

As illustrated at 102, the network entity 1 may determine that no PDR with the traffic descriptor is installed at one or more other network entities. For example, the network entity 1 may determine that there is no PDR associated with a particular traffic descriptor that matches that included in the subscription request. As illustrated at 104, the network entity 1 may copy an installed PDR that would have previously matched the traffic associated with the traffic descriptor included in the subscription request to a new PDR. For example, the network entity 1 may determine which installed PDR would have applied to the traffic descriptor, and may copy that PDR to a new PDR.

In some embodiments, the information that identifies the notification action may include forwarding action rule (FAR). The FAR may be associated with a buffering action and a buffering action rule. The buffering action rule may indicate a notification of a buffered packet or a discarded packet is requested. In some embodiments, the network entity 1 may add, to the new PDR, a pointer that points to the FAR. In some embodiments, the network entity 1 may copy a FAR, associated with the installed PDR, to a FAR associated with the new PDR. Additionally, or alternatively, the network entity 1 may add, to the PDR, the indication to the copied FAR that a notification of a first buffered packet or a first discarded packet is requested.

For instance, for the DDD status and/or DDN failure notifications, the network entity 1 may provide a PDR with a pointer to a FAR with action configured as buffer and a buffer action rule indicating that a notification of the first buffered and/or a notification of the first discarded packet is requested. The network entity 1 may copy the FAR that was pointed to by the PDR that would have previously matched the incoming traffic and may add an indication that a notification of the first buffered and/or a notification of the first discarded packet is requested. The SMF may add a pointer to that new FAR within the new PDR.

In some embodiments, the network entity 1 may receive another notification (e.g., either for another DDD status notification or another DDN failure notification, where the subscription request and the second subscription request are associated with a same traffic descriptor). In some embodiments, the network entity 1 may determine to reuse a new PDR. The network entity 1 may provide, to another network entity, information that identifies the notification action corresponding to the other subscription request (e.g., where the information is associated with the new PDR). For instance, if the network entity 1 obtains subscriptions for both the DDD status and DDN failure notifications with the same traffic descriptors, it can reuse the PDR generated for the first subscription and update the related PDR with an indication that a notification of the first buffered or a notification of the first discarded packet is requested according to the second subscription.

As illustrated at 106, the network entity 1 may provide, to the network entity 2, the new PDR in association with the traffic descriptor, information that identifies a priority for the new PDR, and/or information that identifies the notification action corresponding to the subscription request for the notification. In some embodiments, the network entity 1 may determine the priority for the new PDR as a higher priority than another priority assigned to the installed PDR. Additionally, or alternatively, the priority for the new PDR may be a higher priority relative to one or more other priorities that network entity 3 may be capable of assigning, as described elsewhere herein. In some embodiments, when assigning the priority to the PDR, the network entity 1 may determine whether PCC is being used by the network entity 3. If the network entity 1 determines that the network entity 3 is using PCC (e.g., based on receiving information from the network entity 3, based on being configured with information regarding whether the network entity 3 is using PCC, and/or the like), then the network entity 1 may assign a priority for the new PDR from a set of reserved priority values not associated with the use of the PCC.

As illustrated at 108, the network entity 2 may determine that an event matching the received PDR (the new PDR) and the notification action have occurred. For example, the network entity 2 may determine that buffering or dropping/discarding of a packet associated with a traffic descriptor (e.g., downlink data matching the new PDR) has occurred. As illustrated at 110, the network entity 2 may provide, to the network entity 1, a report that the event and/or the notification action have occurred. In some embodiments, the network entity 1 may provide the report to one or more other network entities, such as an access management function (AMF).

In certain embodiments, the network entity 3 may perform one or more operations in connection with operations 100 through 110 (before, after, or at a same time as operations 100 through 110). As illustrated at 112, the network entity 3 may determine a set of priority values reserved for allocation by one or more other network entities to one or more PDRs In some embodiments, the set of priority values or an indication that a set of priority values needs to be reserved may be stored in, or associated with, a subscriber profiled in a database (e.g., a database stored by user data repository (UDR) (not illustrated in FIG. 1)). As illustrated at 114, the network entity 3 may determine a priority value and a traffic descriptor for a PCC rule in such a manner that the priority value is not included in the set of priority values reserved for allocation described above.

For instance, the network entity 3 may be configured to not use priority values from a reserved range. The reserved range and/or an indication to reserve a range of priority values may be part of a subscriber profile stored in a database such as a UDR and may be read by the network entity 3. As illustrated at 116, the network entity 3 may provide, to the network entity 1, a PCC rule including a traffic descriptor and information that identifies a priority for the PCC rule. The network entity 1 may derive a PDR from the PCC rule and assign the same priority and traffic descriptor as received in the PCC ruler to the PDR.

As described above, FIG. 1 is provided as an example. Other examples are possible, according to some embodiments.

Figure 2:
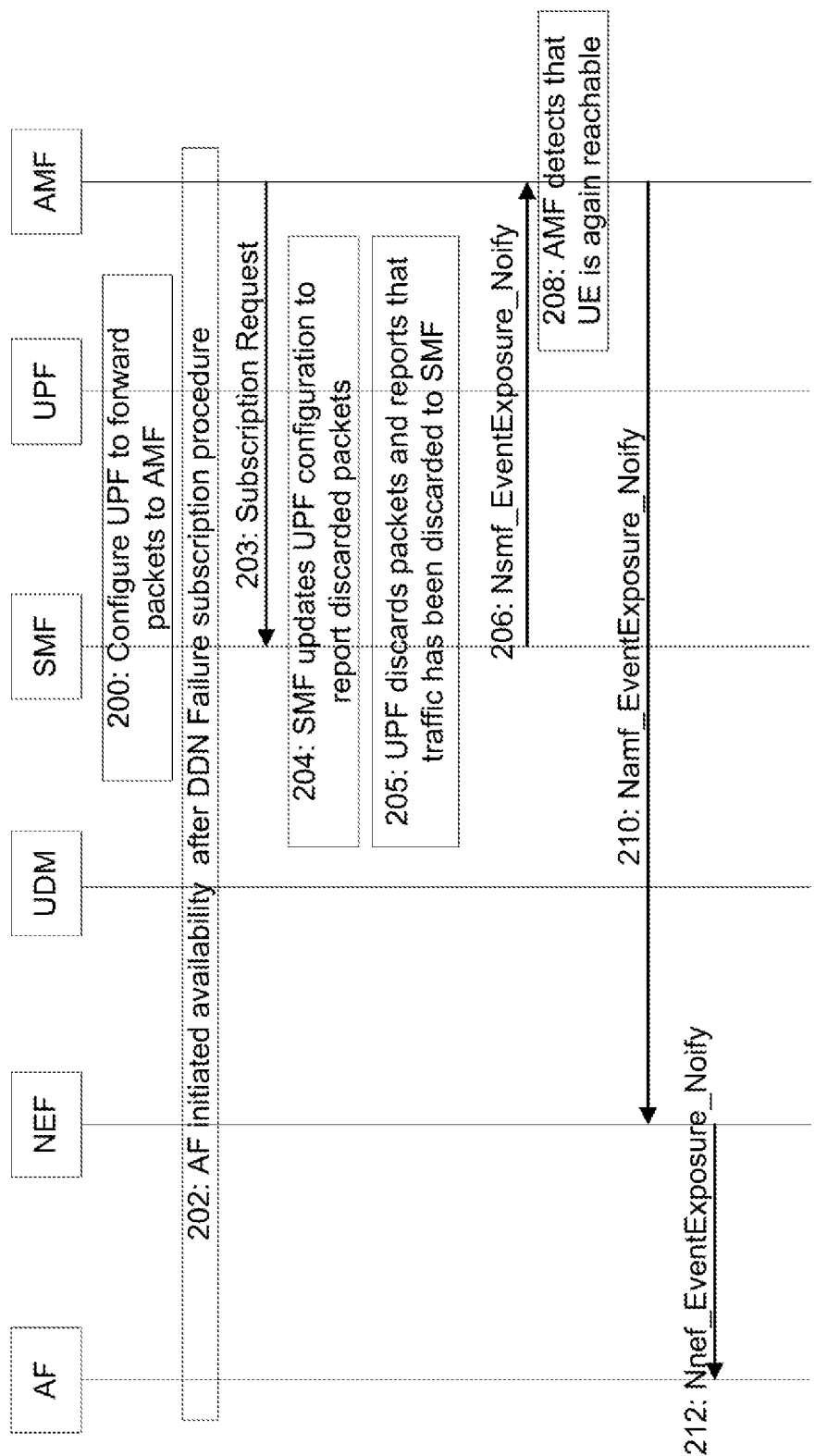
FIG. 2 illustrates an example signal diagram of an information flow for availability after downlink data notification (DDN) failure with UPF buffering, according to some embodiments.

FIG. 2 illustrates an example signal diagram of an information flow for availability after DDN failure with UPF buffering, according to some embodiments. FIG. 2 illustrates various operations of various network entities, such as an application function (AF), a network exposure function (NEF), a UDM, a SMF, a UPF, and an AMF. The procedures illustrated in, and described with respect to, FIG. 2 may be used if the SMF requests the UPF to buffer packets. The procedure may describe a mechanism for the AF to subscribe to notifications about availability after DDN failure. Cancelling may be done by sending an Nnef_EventExposure_Unsubscribe request identifying the subscription to cancel with a subscription correlation identifier (e.g., a subscription correlation ID).

As illustrated at 200, the SMF (e.g., a H-SMF in a non-roaming case, a V-SMF in a roaming case, an I-SMF in a case of a PDU session with the I-SMF) may configure a UPF to forward packets to the AMF. The SMF may supply a PDR with a wildcarded traffic descriptor. If PCC is used, the SMF may derive that PDR from a PCC rule supplied by a PCF.

As illustrated at 202, the AF may interact with the NEF to subscribe to availability after DDN failure notifications and may provide a traffic descriptor describing traffic sent by the AF within the subscription request. The NEF may then subscribe to availability after DDN failure notifications at the UDM, and the UDM may then subscribe to availability after DDN failure notifications at the AMF.

As illustrated at 203, the AMF may subscribe to DDN Failure status notification by sending, for example, the Nsmf_PDUSession_UpdateSMContext Request message to the SMF, requesting the SMF to notify about DDN Failure and may supply the traffic descriptor.

As illustrated at 204, if the SMF is informed that a UE is unreachable via, for example, a Namf_Communication_N1N2MessageTransfer service operation, the SMF may provide a traffic descriptor in a PDR and may request the UPF to report when there are corresponding discarded packets in the UPF. If there is no installed PDR with the same traffic descriptor, the SMF may copy the installed PDR that would have previously matched the incoming traffic described by the traffic descriptor in the notification subscription (for instance the PDR installed at 200) to a new PDR. The SMF may provide that traffic descriptor and a higher priority within the new PDR, may associate the new PDR with a buffer action including a request for notification about discarded packets, and may install that new PDR at the UPF.

If PCC is used, the SMF may assign a priority to the PDR from a reserved range with higher priorities than other priorities supplied by the PCF.

As illustrated at 205 and 206, when the UPF determines to discard downlink data matching the received PDR, it may report the corresponding event to the SMF and the SMF may send the event report, by means of Nsmf_EventExposure_Notify message, to the AMF indicated as a notification endpoint. If the UE is not reachable after the AMF received the notification from the SMF, the AMF may set a Notify-on-available-after-DDN-failure flag corresponding to a notification correlation identifier and the identifier of the UE, if available.

As illustrated at 208 and 210, the AMF may detect that the UE is reachable and may sends the event report(s) based on the Notify-on-available-after-DDN-failure flag, by means of Namf_EventExposure_Notify message(s), to the NEF(s) indicated as notification endpoint(s) identified via the corresponding subscription in operation 206. In this way, only the AF(s) for which downlink traffic transmission failed may be notified. As illustrated at 212, the NEF may send an Nnef_EventExposure_Notify message with an "availability after DDN failure" event to the AF.

As indicated above, FIG. 2 is provided as an example. Other examples are possible, according to some embodiments.

Figure 3:
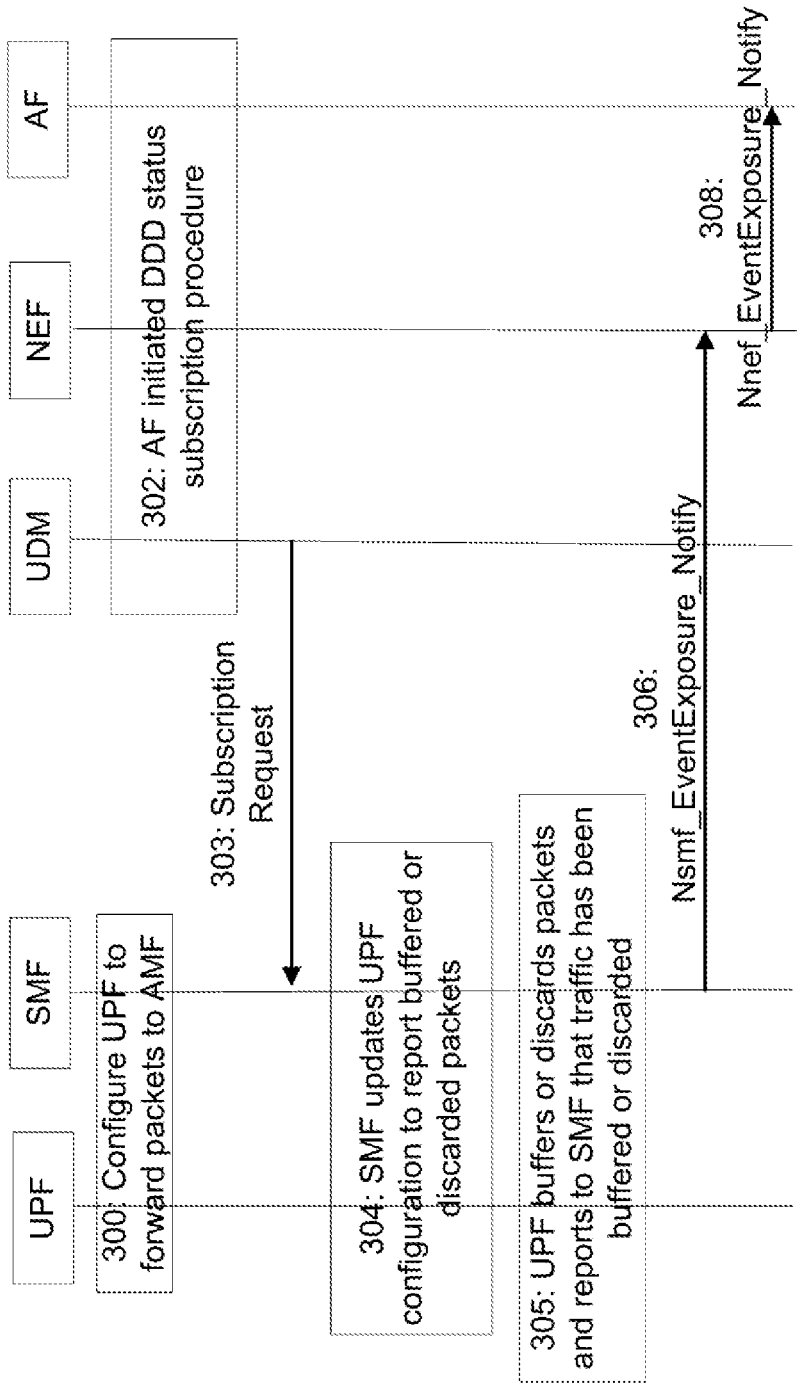
FIG. 3 illustrates an example signal diagram of an information flow for downlink data delivery (DDD) status with UPF buffering, according to some embodiments.

FIG. 3 illustrates an example signal diagram of an information flow for downlink data delivery (DDD) status with UPF buffering, according to some embodiments. FIG. 3 illustrates various operations of various network entities, such as an AF, a NEF, a UDM, a SMF, and a UPF. The procedures illustrated in, and described with respect to, FIG. 3, may be used if the SMF requests the UPF to buffer packets. The procedures may provide a way for the AF to subscribe to notifications about downlink data delivery notification. The data delivery status notifications may relate to high latency communication. Cancelling may be done by sending a Nnef_EventExposure_Unsubscribe request identifying the subscription to cancel with a subscription correlation identifier (e.g., a Subscription Correlation ID).

As illustrated at 300, the SMF (in the non-roaming case the SMF, in the roaming case the V-SMF, in case of PDU session with I-SMF the I-SMF) may configure a UPF to forward packets to the AMF. The SMF may supply a PDR with a wildcarded traffic descriptor. If PCC is used, the SMF may derive that PDR from a PCC rule supplied by a PCF.

As illustrated at 302, the AF may interact with the NEF to subscribe to a DDD status notification, for example, a notification about a buffered or discarded packet. The AF may provide a traffic descriptor describing traffic sent by the AF within the subscription request and the NEF may then subscribe to DDD status notification at the UDM.

As illustrated at 303, the UDM may subscribe to DDD status notifications by sending, for example, the Nsmf_EventExposure_Subscribe message to the SMF and supplying the traffic descriptor.

As illustrated at 304, the SMF may be informed that a UE is unreachable via a Namf_Communication_N1N2MessageTransfer service operation. In some embodiments, when the DDD status event with a traffic descriptor is received in the SMF, if extended downlink data buffering in the UPF applies, to request the UPF to buffer the downlink data, the SMF may provide the traffic descriptor in a PDR and may request the UPF to report when there are corresponding buffered downlink packets or discarded packets in the UPF. If there is no installed PDR with the same traffic descriptor, the SMF may copy the installed PDR that would have previously matched the incoming traffic described by the traffic descriptor in the notification subscription (for example the PDR at 300) into a new PDR, may provide that traffic descriptor and a higher priority in that new PDR, may associate that new PDR with a buffer action including a request for notification about buffered or discarded packets, and may install that new PDR at the UPF. If PCC is used. the SMF may assign a priority to the PDR from a reserved range with higher priorities than other priorities supplied by the PCF.

As illustrated at 305, the UPF may report when there is buffered or discarded traffic matching the received PDR to the SMF and the SMF may send the corresponding event report, by, for example, means of a Nsmf_EventExposure_Notify message.

As illustrated at 306, the SMF may send a Nsmf_EventExposure_Notify with Downlink Delivery Status event message to the NEF. As illustrated at 308, the NEF may send a Nnef_EventExposure_Notify with Downlink Delivery Status event message to the AF.

As described above, FIG. 3 is provided as an example. Other examples are possible, according to some embodiments.

Figure 4:
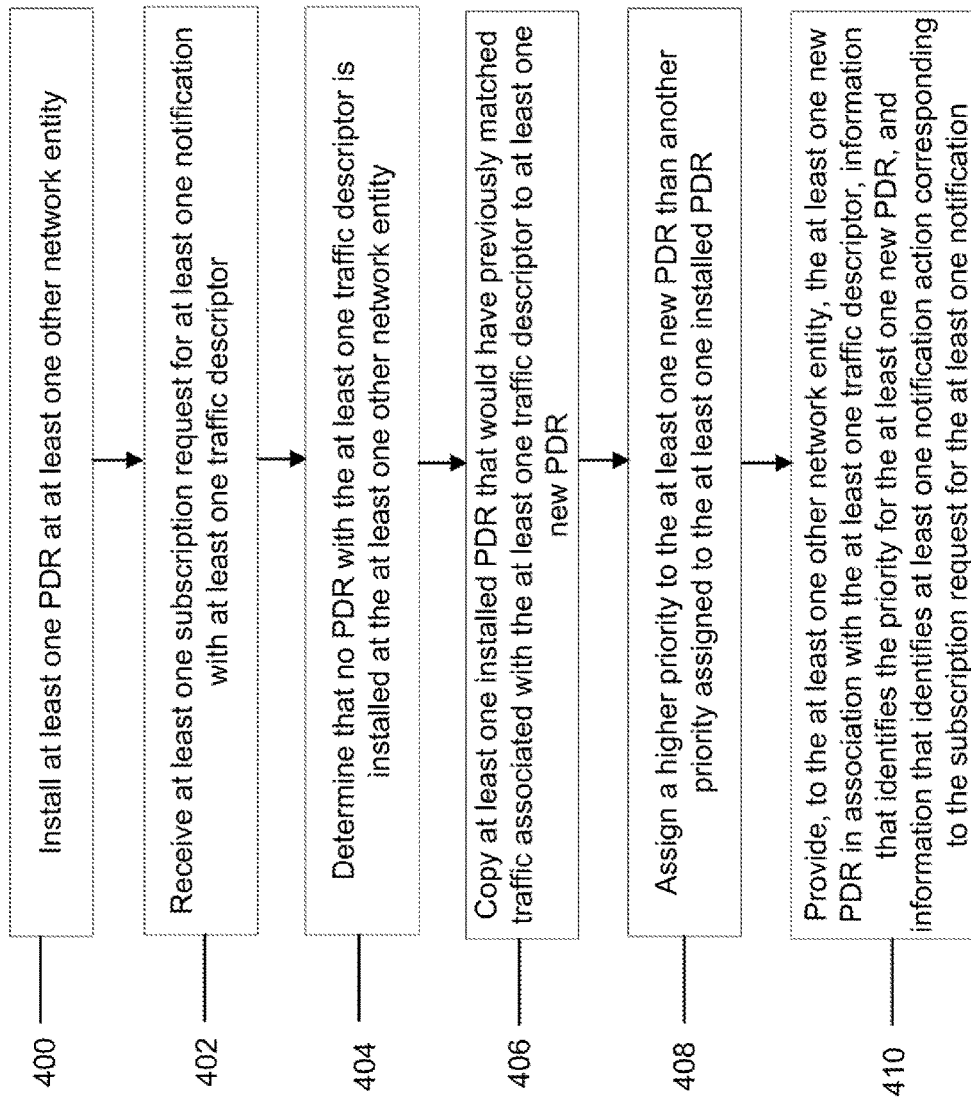
FIG. 4 illustrates an example flow diagram of a method, according to some embodiments.

FIG. 4 illustrates an example flow diagram of a method, according to some embodiments. For example, FIG. 4 shows example operations of a network entity (e.g., hosted on apparatus 10), such as a SMF. Some of the operations illustrated in FIG. 4 may be similar to some operations shown in, and described with respect to, FIGS. 1-3.

In an embodiment, the method may include, at 400, installing at least one PDR at at least one other network entity. In an embodiment, the method may include, at 402, receiving at least one subscription request for at least one notification with at least one traffic descriptor. The at least one subscription request may comprise at least one traffic descriptor. In an embodiment, the method may include, at 404, determining that no PDR with the at least one traffic descriptor is installed at the at least one other network entity. In an embodiment, the method may include, at 406, copying at least one installed PDR that would have previously matched traffic associated with the at least one traffic descriptor to at least one new PDR. In an embodiment, the method may include, at 408, assigning a higher priority to the at least one new PDR than another priority assigned to the at least one installed PDR. In an embodiment, the method may include, at 410, providing, to the at least one other network entity, the at least one new PDR in association with the at least one traffic descriptor, information that identifies the priority for the at least one new PDR, and information that identifies at least one notification action corresponding to the subscription request for the at least one notification.

The at least one notification may comprise at least one DDD status notification or at least one DDN failure notification. The priority for the at least one new PDR may be a higher priority relative to one or more other priorities. In some embodiments, the one or more other priorities may be assignable at one or more third network entities. In some embodiments, the method may include determining whether PCC is being used. In some embodiments, the method may include assigning the priority for the at least one new PDR from a set of reserved priority values not associated with the use of the PCC. In some embodiments, the information that identifies at least one notification action may further comprise at least one FAR. In some embodiments, the at least one FAR may be associated with at least one buffering action and at least one buffering action rule. In some embodiments, the at least one buffering action rule may indicate that at least one notification of at least one first buffered packet or at least one first discarded packet is requested.

In some embodiments, the method may include adding, to the at least one new PDR, at least one pointer that points to the at least one FAR. In some embodiments, the method may include copying at least one FAR, associated with the at least one installed PDR, to the at least one FAR associated with the at least one new PDR. In some embodiments, the method may include adding an indication to the at least one copied FAR associated with the at least one new PDR that at least one notification of at least one first buffered packet or at least one first discarded packet is requested.

In some embodiments, the method may include receiving at least one second subscription request for at least one second notification. The at least one subscription request and the at least one second subscription request may be associated with a same traffic descriptor. In some embodiments, the method may include determining to reuse one or more new PDRs. In some embodiments, the method may include providing, to the at least one other network entity, information that identifies at least one notification action corresponding to the second subscription request for the at least one second notification. In some embodiments, the information may be associated with the at least one new PDR. In some embodiments, the at least one second notification may comprise at least one DDD status notification or at least one DDN failure notification. In some embodiments, the method may include receiving at least one report of at least one occurrence of at least one event associated with the at least one new PDR. In some embodiments, the method may include providing the at least one report to one or more other network entities.

As described above, FIG. 4 is provided as an example. Other examples are possible according to some embodiments.

FIG. 5 illustrates an example flow diagram of a method, according to some embodiments. For example, FIG. 5 shows example operations of a network entity (e.g., hosted by apparatus 10), such as a PCF. Some of the operations illustrated in FIG. 5 may be similar to some operations shown in, and described with respect to, FIGS. 1-3.

In an embodiment, the method may include, at 500, determining at least one set of reserved priority values. In an embodiment, the method may include, at 502, determining at least one priority value for at least one PCC rule. The at least one priority value is not included in the at least one set of reserved priority values. In an embodiment, the method may include, at 504, providing the at least one PCC rule to at least one other network entity.

In some embodiments, the method may include the at least one set of reserved priority values or at least one indication to apply the at least one set of reserved priority values is associated with at least one subscriber profile stored in at least one database. In some embodiments, the method may include reading the at least one set of reserved priority values or the at least one indication to apply the at least one set of reserved priority values from the at least one database. In some embodiments, the set of priority values may be reserved for allocation to one or more PDRs at the at least one other network entity.

As described above, FIG. 5 is provided as an example. Other examples are possible according to some embodiments.

FIG. 6a illustrates an example of an apparatus 10 according to an embodiment. In an embodiment, apparatus 10 may be a node, host, or server in a communications network or serving such a network. For example, apparatus 10 may be a network node, a SMF, a PCF, and/or the like.

It should be understood that, in some example embodiments, apparatus 10 may be comprised of an edge cloud server as a distributed computing system where the servers may be stand-alone apparatuses communicating with each other via a radio path or via a wired connection, or they may be located in a same entity communicating via a wired connection. It should be noted that one of ordinary skill in the art would understand that apparatus 10 may include components or features not shown in FIG. 6a.

As illustrated in the example of FIG. 6a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 6a, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, or the like.

According to certain embodiments, apparatus 10 may be controlled by memory 14 and processor 12 to perform the functions associated with any of the embodiments described herein, such as some operations of flow or signaling diagrams illustrated in FIGS. 1-5.

For instance, in one embodiment, apparatus 10 may be controlled by memory 14 and processor 12 to install at least one PDR at least one other network entity. In one embodiment, apparatus 10 may be controlled by memory 14 and processor 12 to receive at least one subscription request for at least one notification. The at least one subscription request may comprise at least one traffic descriptor. In one embodiment, apparatus 10 may be controlled by memory 14 and processor 12 to determine that no PDR with the at least one traffic descriptor is installed at the at least one other network entity. In one embodiment, apparatus 10 may be controlled by memory 14 and processor 12 to copy at least one installed PDR that would have previously matched traffic associated with the at least one traffic descriptor to at least one new PDR. In one embodiment, apparatus 10 may be controlled by memory 14 and processor 12 to assign a higher priority to the at least one new PDR than another priority assigned to the at least one installed PDR. In one embodiment, apparatus 10 may be controlled by memory 14 and processor 12 to provide, to the at least one other network entity, the at least one new PDR in association with the at least one traffic descriptor, information that identifies the priority for the at least one new PDR, and information that identifies at least one notification action corresponding to the subscription request for the at least one notification.

For instance, in one embodiment, apparatus 10 may be controlled by memory 14 and processor 12 to determine at least one set of reserved priority values. In one embodiment, apparatus 10 may be controlled by memory 14 and processor 12 to determine at least one priority value for at least one PCC rule. The at least one priority value may not be included in the at least one set of reserved priority values. In one embodiment, apparatus 10 may be controlled by memory 14 and processor 12 to provide the at least one PCC rule to at least one other network entity.

FIG. 6b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 6b.

As illustrated in the example of FIG. 6b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 6b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with example embodiments described herein. For example, in some embodiments, apparatus 20 may be configured to perform one or more of the processes depicted in any of the flow charts or signaling diagrams described herein, such as those illustrated in FIGS. 1-5.

Therefore, certain example embodiments provide several technological improvements, enhancements, and/or advantages over existing technological processes. For example, one benefit of some example embodiments is avoidance of different subscription paths depending on whether PCC is used, while keeping PCC optional. In addition, certain embodiments may provide operations so that packets are still handled according to instructions provided by a PCF. Accordingly, the use of some example embodiments results in improved functioning of communications networks and their nodes and, therefore constitute an improvement at least to the technological field of policy control and packet filters, among others.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations required for implementing functionality of an example embodiment may be performed as routine(s), which may be implemented as added or updated software routine(s). In one example, software routine(s) may be downloaded into the apparatus.

As an example, software or a computer program code or portions of code may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein apply equally to both singular and plural implementations, regardless of whether singular or plural language is used in connection with describing certain embodiments. For example, an embodiment that describes operations of a single network entity equally applies to embodiments that include multiple instances of the network entity, and vice versa.

One having ordinary skill in the art will readily understand that the example embodiments as discussed above may be practiced with operations in a different order, and/or with hardware elements in configurations which are different than those which are disclosed. Therefore, although some embodiments have been described based upon these example preferred embodiments, it would be apparent to those of skill in the art that certain modifications, variations, and alternative constructions would be apparent, while remaining within the spirit and scope of example embodiments.

According to a first embodiment, a method may include installing at least one PDR at at least one other network entity. The method may include receiving at least one subscription request for at least one notification. The at least one subscription request may comprise at least one traffic descriptor. The method may include determining that no PDR with the at least one traffic descriptor is installed at the at least one other network entity. The method may include copying at least one installed PDR that would have previously matched traffic associated with the at least one traffic descriptor to at least one new PDR. The method may include assigning a higher priority to the at least one new PDR than another priority assigned to the at least one installed PDR. The method may include providing, to the at least one other network entity, the at least one new PDR in association with the at least one traffic descriptor, information that identifies the priority for the at least one new PDR, and information that identifies at least one notification action corresponding to the subscription request for the at least one notification.

In a variant, the at least one notification may comprise at least one DDD status notification or at least one DDN failure notification. In a variant, the priority for the at least one new PDR may be a higher priority relative to one or more other priorities. In a variant, the one or more other priorities may be assignable at one or more third network entities. In a variant, the method may include determining whether PCC is being used. In a variant, the method may include assigning the priority for the at least one new PDR from a set of reserved priority values not associated with the use of the PCC. In a variant, the information that identifies at least one notification action may further comprise at least one FAR. In a variant, the at least one FAR may be associated with at least one buffering action and at least one buffering action rule. In a variant, the at least one buffering action rule may indicate that at least one notification of at least one first buffered packet or at least one first discarded packet is requested.

In a variant, the method may include adding, to the at least one new PDR, at least one pointer that points to the at least one FAR. In a variant, the method may include copying at least one FAR, associated with the at least one installed PDR, to the at least one FAR associated with the at least one new PDR. In a variant, the method may include adding an indication to the at least one copied FAR associated with the at least one new PDR that at least one notification of at least one first buffered packet or at least one first discarded packet is requested.

In a variant, the method may include receiving at least one second subscription request for at least one second notification. In a variant, the at least one subscription request and the at least one second subscription request may be associated with a same traffic descriptor. In a variant, the method may include determining to reuse one or more new PDRs. In a variant, the method may include providing, to the at least one other network entity, information that identifies at least one notification action corresponding to the second subscription request for the at least one second notification. In a variant, the information may be associated with the at least one new PDR. In a variant, the at least one second notification may comprise at least one DDD status notification or at least one DDN failure notification. In a variant, the method may include receiving at least one report of at least one occurrence of at least one event associated with the at least one new PDR. In some embodiments, the method may include providing the at least one report to one or more other network entities.

According to a second embodiment, a method may include determining at least one set of reserved priority values. The method may include determining at least one priority value for at least one PCC rule. The at least one priority value is not included in the at least one set of reserved priority values. The method may include providing the at least one PCC rule to at least one other network entity.

In a variant, the method may include the at least one set of reserved priority values or at least one indication to apply the at least one set of reserved priority values is associated with at least one subscriber profile stored in at least one database. In a variant, the method may include reading the at least one set of reserved priority values or the at least one indication to apply the at least one set of priority values from the at least one database. In a variant, wherein the at least one set of reserved priority values may be reserved for allocation to the one or more packet detection rules (PDRs) at the at least one other network entity.

A third embodiment may be directed to an apparatus including at least one processor and at least one memory comprising computer program code. The at least one memory and computer program code may be configured, with the at least one processor, to cause the apparatus at least to perform the method according to the first embodiment or the second embodiment, or any of the variants discussed above.

A fourth embodiment may be directed to an apparatus that may include circuitry configured to perform the method according to the first embodiment or the second embodiment, or any of the variants discussed above.

A fifth embodiment may be directed to an apparatus that may include means for performing the method according to the first embodiment or the second embodiment, or any of the variants discussed above.

A sixth embodiment may be directed to a computer readable medium comprising program instructions stored thereon for performing at least the method according to the first embodiment or the second embodiment, or any of the variants discussed above.

I claim:

1. A method, comprising:
   installing, by a network entity, at least one packet detection rule at at least one other network entity;
   receiving at least one subscription request for at least one notification, wherein the at least one subscription request comprises at least one traffic descriptor;
   determining that no packet detection rule with the at least one traffic descriptor is installed at the at least one other network entity;
   copying at least one installed packet detection rule that would have previously matched traffic associated with the at least one traffic descriptor to at least one new packet detection rule;

assigning a higher priority to the at least one new packet detection rule than another priority assigned to the at least one installed packet detection rule; and providing, to the at least one other network entity, the at least one new packet detection rule in association with the at least one traffic descriptor, information that identifies the priority for the at least one new packet detection rule, and information that identifies at least one notification action corresponding to the subscription request for the at least one notification.

2. The method according to claim 1, wherein the at least one notification comprises at least one downlink data delivery status notification or at least one downlink data notification failure notification.

3. The method according to claim 1, wherein the information that identifies at least one notification action further comprises:

at least one forwarding action rule,
wherein the at least one forwarding action rule is associated with at least one buffering action and at least one buffering action rule,
wherein the at least one buffering action rule indicates that at least one notification of at least one first buffered packet or at least one first discarded packet is requested.

4. The method according to claim 1, further comprising:
receiving at least one report of at least one occurrence of at least one event associated with the at least one new packet detection rule; and
providing the at least one report to one or more other network entities.

5. An apparatus, comprising:
at least one processor; and
at least one memory including computer program code,
wherein the at least one memory and the computer program code are configured to, with the at least one processor, cause the apparatus at least to:
install at least one packet detection rule at least one other apparatus;
receive at least one subscription request for at least one notification, wherein the at least one subscription request comprises at least one traffic descriptor;
determine that no packet detection rule with the at least one traffic descriptor is installed at the at least one other apparatus;
copy at least one installed packet detection rule that would have previously matched traffic associated with the at least one traffic descriptor to at least one new packet detection rule;
assign a higher priority to the at least one new packet detection rule than another priority assigned to the at least one installed packet detection rule; and
provide, to the at least one other apparatus, the at least one new packet detection rule in association with the at least one traffic descriptor, information that identifies the priority for the at least one new packet detection rule, and information that identifies at least one notification action corresponding to the subscription request for the at least one notification.

6. The apparatus according to claim 5, wherein the at least one notification comprises at least one downlink data delivery status notification or at least one downlink data notification failure notification.

7. The apparatus according to claim 5, wherein the information that identifies at least one notification action further comprises:

at least one forwarding action rule,
wherein the at least one forwarding action rule is associated with at least one buffering action and at least one buffering action rule,
wherein the at least one buffering action rule indicates that at least one notification of at least one first buffered packet or at least one first discarded packet is requested.

8. The apparatus according to claim 5, wherein the at least one memory and the computer program code are configured to, with the at least one processor, further cause the apparatus at least to:
receive at least one report of at least one occurrence of at least one event associated with the at least one new packet detection rule; and
provide the at least one report to one or more other network entities.

9. A non-transitory computer readable medium comprising program instructions, when executed by a processor of an apparatus, cause the apparatus to perform at least the following:
installing at least one packet detection rule at at least one network entity; receiving at least one subscription request for at least one notification, wherein the at least one subscription request comprises at least one traffic descriptor;
determining that no packet detection rule with the at least one traffic descriptor is installed at the at least one network entity;
copying at least one installed packet detection rule that would have previously matched traffic associated with the at least one traffic descriptor to at least one new packet detection rule;
assigning a higher priority to the at least one new packet detection rule than another priority assigned to the at least one installed packet detection rule; and
providing, to the at least one other apparatus, the at least one new packet detection rule in association with the at least one traffic descriptor, information that identifies the priority for the at least one new packet detection rule, and information that identifies at least one notification action corresponding to the subscription request for the at least one notification.

10. The non-transitory computer readable medium according to claim 9, wherein the at least one notification comprises at least one downlink data delivery status notification or at least one downlink data notification failure notification.

11. The non-transitory computer readable medium according to claim 9, wherein the information that identifies at least one notification action further comprises:

at least one forwarding action rule,
wherein the at least one forwarding action rule is associated with at least one buffering action and at least one buffering action rule,
wherein the at least one buffering action rule indicates that at least one notification of at least one first buffered packet or at least one first discarded packet is requested.

12. The non-transitory computer readable medium according to claim 9, further comprising program instructions for causing an apparatus to further perform at least the following:
receiving at least one report of at least one occurrence of at least one event associated with the at least one new packet detection rule; and
providing the at least one report to one or more other network entities.

* * * * *